G. A. CARTER.
Watering-Tanks for Hogs.
No. 152,330.  Patented June 23, 1874.
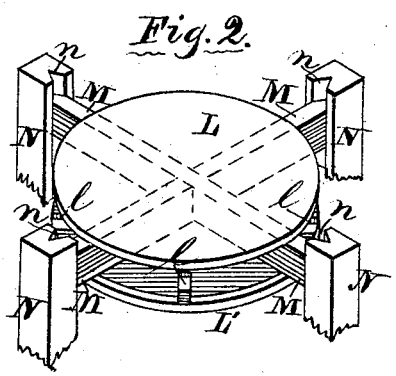
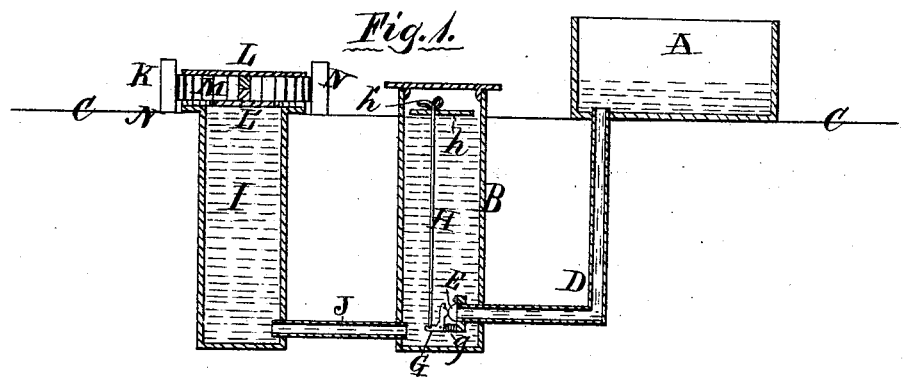
Witnesses:
Platt R. Richards.
M. H. Barringer.
Inventor,
George A. Carter,
by W. B. Richards,
Atty.

UNITED STATES PATENT OFFICE.

GEORGE A. CARTER, OF PRINCETON, ILLINOIS.

IMPROVEMENT IN WATERING-TANKS FOR HOGS.

Specification forming part of Letters Patent No. 152,330, dated June 23, 1874; application filed January 6, 1874.

*To all whom it may concern:*

Be it known that I, GEORGE A. CARTER, of Princeton, county of Bureau and State of Illinois, have invented certain Improvements in Self-Regulating Watering-Tanks for Hogs, of which the following is a specification:

The nature of my invention relates to improvements in tanks for watering hogs; and the invention consists in covering the watering-tank, which is suitably connected with a regulating-tank and supply-tank or reservoir, with a perforated disk or cover, the cover preventing the hogs from getting into the water, and the perforations or openings in the cover being such as only to permit of the hogs getting their snouts into the water, thereby preventing waste and keeping the water clean, said lower cover being provided with an additional upper cover or disk and radial arms, for the purpose of keeping the hogs and other cattle from off the lower or slotted cover of the watering-tank, all as hereinafter more fully set forth.

In the accompanying drawings, Figure 1 is a vertical central sectional view of my invention, and Fig. 2 is a perspective view of the top of the watering-tank and the cover therefor.

Referring to the parts by letters, letter A represents a reservoir, supposed to contain a continuous supply of water, furnished by a windmill and pump, or by any other means. B is the feeder-tank, buried, as shown by the drawings, a greater portion of its length beneath the surface of the ground-line C, and connected by a pipe, D, with the reservoir A, as shown. E is a clack-valve on the entrance of the pipe D to the tank B. G is an elbow-lever, pivoted, at its bend, to a standard, $g$, projecting from the side of the tank B. H is a wire rod, extending from one end of the elbow-lever G upward, and provided on its upper end with a float, $h$, the height of which may be adjusted on the wire H by turning a bow, $h'$, on the upper end of the wire. I is the watering-tank, from which the animals drink. It is buried beneath the surface of the ground, the same as the tank B, but with its top or upper end somewhat lower than the upper end of the tank B, and is connected by an underground pipe, J, with the tank B. K is the cover for the watering-tank, and is composed of two circular disks, of plank or other suitable material, L L', bolted to radial arms M M M M, the outer ends of which extend beyond the disks L, as shown in the drawings. The outer ends of the arms M fit in groove $n$ in posts N, which hold them firmly from any side motion, but allow the cover K to be lifted and removed, when desired. The arms M may be simply bolted to the sides of the posts N. The lower disk L' is pierced with holes $l\ l\ l\ l$, one between each pair of arms M M, which holes are made lengthy and narrow, as shown at Fig. 2, so that hogs can only get their snouts through and reach the water, which is kept accessible by the regulating-float and valve in the tank B, which acts as a feeder to the tank I. The upper disk L serves to keep the hogs, and also other animals, from getting upon and getting their feet through the holes $l\ l\ l\ l$ in the disk L', and the arms M aiding in the same, and also keeping them from getting upon and lying down on the disk L'.

To any one skilled in the art, it will be evident that the height of water in the tank I may be regulated by adjusting the float $h$ on the rod H, as shown at Fig. 1, in such manner that when the water rises to the desired height in the tanks B and I, the float $h$ will turn the elbow-lever G and close the valve E, thus stopping further supply to the tank I, and any further drain from the water in the tank A; and also that the arrangement of the tanks B and I, and pipes D and J, are below the ground, in such manner as to preserve the water within them free from the formation of ice in any ordinary temperature; and, further, that the device will furnish a constant supply of water accessible to hogs, and without allowing waste from the water in the tank A.

I claim—

In combination with a watering-tank, I, connected with a regulating-tank and reservoir, substantially as set forth, the perforated cover or disk L' and upper protecting shield or cover L, having arms M, all operating substantially as and for the purpose specified.

GEORGE A. CARTER.

Witnesses:
PLATT R. RICHARDS,
J. B. BOGGS.